United States Patent [19]

Kasai

[11] Patent Number: 5,209,576
[45] Date of Patent: May 11, 1993

[54] LINEAR MOTION GUIDE UNIT HAVING A SYNCHRONIZED RETAINER

[75] Inventor: Naomi Kasai, Tokyo, Japan

[73] Assignee: Nippon Thompson Co., Ltd., Japan

[21] Appl. No.: 811,522

[22] Filed: Dec. 20, 1991

[30] Foreign Application Priority Data

Dec. 20, 1990 [JP] Japan .............................. 2-403802[U]

[51] Int. Cl.⁵ ............................................. F16C 29/04
[52] U.S. Cl. ............................................................ 384/49
[58] Field of Search .................... 384/49, 34, 18, 19, 384/47, 57, 17

[56] References Cited

U.S. PATENT DOCUMENTS 3,857,618 12/1974 Hagen et al. ............................ 384/18
3,966,273 6/1976 Hagen et al. ............................ 384/18
5,076,715 12/1991 Saoyama et al. ....................... 384/49
5,134,670 7/1992 Kamimura ............................. 384/49

*Primary Examiner*—Lenard A. Footland
*Attorney, Agent, or Firm*—Skjerven, Morrill, MacPherson, Franklin & Friel

[57] ABSTRACT

A linear motion guide unit includes a U-shaped bed, a U-shaped table turned upside down, a plurality of rolling members in a guide channel defined between the bed and the table, a retainer for retaining the rolling members in position, a pin provided at each end of the retainer and a belt provided at each end of the unit with its one end fixedly attached to the bed, its other end fixedly attached to the table and its intermediate portion passed around the pin. Thus, the retainer is moved only in synchronism with the table or bed and over a half of the distance travelled by the table or bed.

8 Claims, 3 Drawing Sheets

LINEAR MOTION GUIDE UNIT HAVING A SYNCHRONIZED RETAINER

BACKGROUND OF THE INVENTION

1. Field of the Invention

This invention generally relates to a linear motion guide unit, and, in particular, to such a linear motion guide unit including a retainer which retains rolling members in position and which is moved in synchronism with a bed and a table.

2. Description of the Prior Art

A linear motion rolling contact guide unit is well known in the art and it typically includes a bed, a table, a plurality of rolling members, such as balls or rollers, interposed between the bed and the table and a retainer for retaining the rolling members in position between the bed and the table. Also known is such a linear motion guide unit including a belt for preventing the retainer from being shifted in position as disclosed in the Japanese Patent Laid-open Pub. No. 56-113824. In this unit, however, since a pair of pulleys is disposed on both ends of the retainer and the top and bottom transfer surfaces are connected by belts via respective belts, whereby the movement of the retainer is limited to a half of the bearing unit or guide unit itself through the pulleys and belts and the belts also serve as dust covers.

However, in the prior art structure utilizing belts for preventing the retainer from shifting in position, since the pulleys are disposed outside of the bed and the table, the overall length of the bearing unit or guide unit tends to become excessively long. Besides, in the prior art device, since a pulley is provided at each end of the retainer, the total length of the retainer tends to be longer and the weight of each of these pulleys is added to the bearing unit or guide unit, so that the retainer is more susceptible to deformations and there is also a disadvantage of an increase in the partial abnormal wear and sliding resistance.

SUMMARY OF THE INVENTION

In accordance with the present invention, there is provided an improved linear motion guide unit which generally includes a bed, a table, a plurality of rolling members interposed between the bed and the table and a retainer located between the bed and the table for retaining the rolling members in position.

In a preferred embodiment, the bed is elongated in shape and has a generally U-shaped cross section, and, similarly, the table is also elongated in shape and has a generally U-shaped cross section. The width of either one of the bed and the table is smaller than that of the other such that the one having a smaller width may be located inside the interior space defined by the other having a larger width. In one embodiment, the bed is oriented with its open side facing upward with the table oriented with its open side facing downward so that an enclosed space is defined by the bed and the table.

The bed is provided with a first guiding means in which the rolling members may be partially received. The first guiding means extend in parallel with a longitudinal axis of the bed. The table is also provided with a second guiding means which is located opposite to and extending in parallel with the first guiding means so that a guide channel is defined by a pair of associated first and second guiding means. In a preferred embodiment, each of these first and second guiding means includes a groove engraved on a surface of the bed or table.

The retainer includes a pair of retainer walls each of which is located in a guide channel defined between the associated pair of first and second guiding means for retaining the rolling members in position as spaced apart from each other. The retainer is also elongated in shape, but, of importance, it is shorter in length than any of the bed and the table. Preferably, the bed and the table are substantially identical in length. The retainer is provided with an end guide means at each end thereof. An elongated flexible coupling means has one end fixedly attached to the bed and other end fixedly attached to the table with its intermediate portion extending inwardly and passed around a corresponding one of the end guide means. In a preferred embodiment, the flexible coupling means includes a belt and the end guide means includes a pin mounted on the retainer extending horizontally.

It is therefore a primary object of the present invention to provide an improved linear motion guide unit high in accuracy and performance and compact in size.

Another object of the present invention is to provide an improved linear motion guide unit capable of preventing its retainer from being shifted in position.

A further object of the present invention is to provide an improved linear motion guide unit in which its retainer is synchronized in motion with its bed and table.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic illustration showing in perspective view the retainer 3 provided in the linear motion guide unit shown in FIG. 1a.

DESCRIPTION OF THE PREFERRED EMBODIMENTS

Figure 1A:
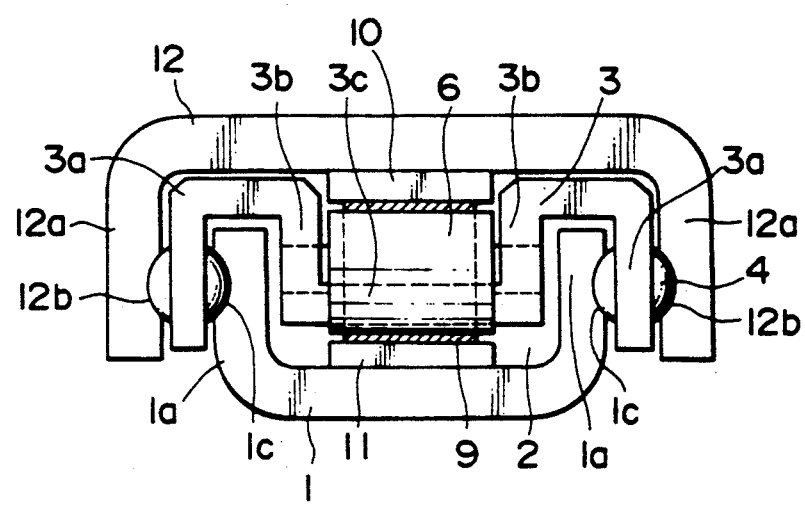
FIG. 1a is a schematic illustration showing in front view a linear motion guide unit constructed in accordance with one embodiment of the present invention.

Referring now to FIG. 1a, there is schematically shown a linear motion guide unit constructed in accordance with one embodiment of the present invention. As shown, the present linear motion guide unit generally includes a bed 1, a table 12, a retainer 3 and a plurality of rolling members 4 interposed between the bed 1 and the table 12. In this embodiment, the bed 1 is elongated in shape and is generally in the shape of a trough, so that it has a generally U-shaped cross section to define an interior space 2 with its open side facing upward. The bed 1 thus has a pair of side walls 1a which extend substantially vertically upward, and an inner guide groove 1c is provided in an outer surface of each of these side walls 1a extending in parallel with a longitudinal axis of the bed 1.

The table 12, on the other hand, is also elongated in shape and has a generally U-shaped cross section, but oriented upside down. Thus, the table 12 also has a horizontal section and a pair of side walls 12a extending substantially vertically from the opposite sides of the horizontal section. An outer guide groove 12b is provided at an inner surface of each of the side walls 12a in an opposed and spaced apart relation with an associated inner guide groove 1c. Thus, a guide channel is defined by a pair of associated inner and outer guide grooves 1c and 12b extending in a direction parallel to the longitudinal axis of the guide unit. In the illustrated embodiment, the table 12 is structured to be larger in width than the bed 1 over a predetermined amount, so that the bed 1 is substantially disposed in an interior space defined by the table 12; however, the present invention should not be limited to only such specific structure and any other combinations between the bed 1 and the table 12 are well within the scope and spirits of the present invention. For example, the bed 1 may be so structured to be larger in width than the table 12, in which case the table 12 may be located substantially in the interior space defined by the bed 1.

A plurality of rolling members 4, or balls in the illustrated embodiment, are provided in each of the guide channels defined between the bed 1 and the table 12 as partly received in both of the opposite inner and outer guide grooves 1c and 12b. Thus, a rolling contact is provided between the bed 1 and the table 12 so that a relative motion may be provided between the bed 1 and the table 12 in either direction. For example, if the bed 1 is fixedly attached to a desired object, the table 12 may be moved relative to the bed 1 in either direction along its longitudinal axis, whereas, if the table 12 is fixedly attached to a desired object, then the bed 1 may be moved relative to the table 12 linearly in either direction. Although use is made of balls 4 in the illustrated embodiment, use may be made of rollers or any other elements as rolling members. If use is made of rollers, they are preferably arranged in a crossed arrangement, i.e., any two adjacent rollers being oriented with their rotating axes extending perpendicular to each other when viewed in a direction parallel with the longitudinal axis of the guide unit.

Figure 3:
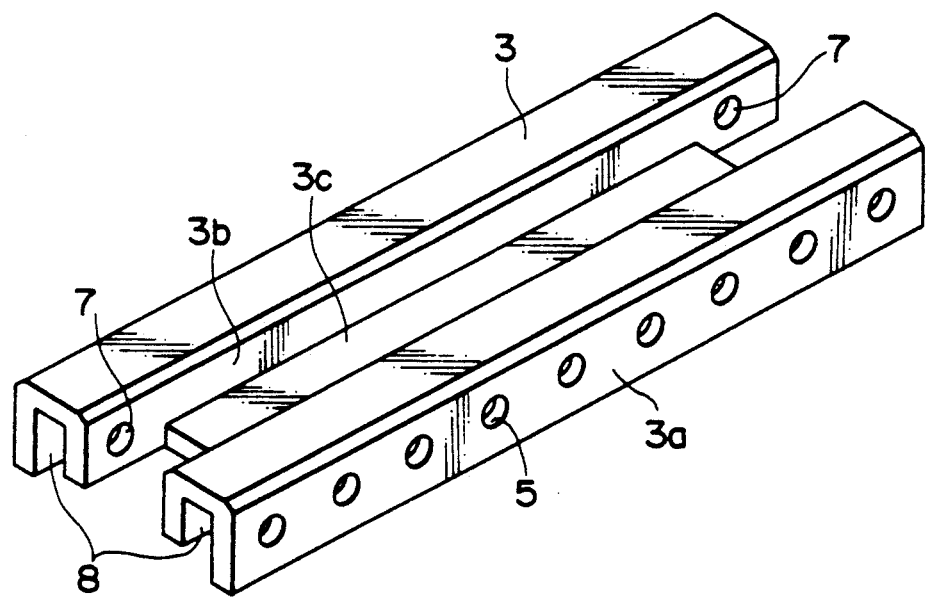

As shown, the present linear motion guide unit also includes a retainer 3 which is located in a gap between the bed 1 and the table 12 for retaining the balls 4 in position as spaced apart from one another in the respective guide channels. In the illustrated embodiment, the retainer 3 has a pair of outer side walls 3a and a pair of inner side walls 3b which are located inside of the outer side walls 3a as spaced apart therefrom and which are connected to the respective outer side walls 3a via respective top walls to thereby define a pair of elongated recesses for receiving therein respective side walls 1a of the bed 1, as best shown in FIGS. 1a and 3. The retainer 3 also has a center wall 3c which is connected between the inner side walls 3b at their bottom. Thus, the retainer 3 has a generally M-shaped cross section as best seen in FIG. 1a.

As shown in FIG. 3, the retainer 3 is generally elongated in shape and both of the outer and inner side walls 3a and 3b are substantially same in length. On the other hand, the center wall 3c is shorter in length than the outer and inner side walls 3a and 3b such that each end of the center wall 3c terminates short of a corresponding end of each of the outer and inner side walls 3a and 3b. It is to be noted that the retainer 3 may be fabricated as an integrated structure or may be assembled from separate components.

Each of the outer side walls 3a is formed with a plurality of holes 5 spaced apart from one another and arranged in a line parallel with the longitudinal axis of the retainer 3 for receiving therein and holding therein respective balls 4. On the other hand, each of the inner side walls 3b is formed with a hole 7 at such a location between its end and the end of the center wall 3c for receiving therein one end portion of a pin 6.

Figure 1B:
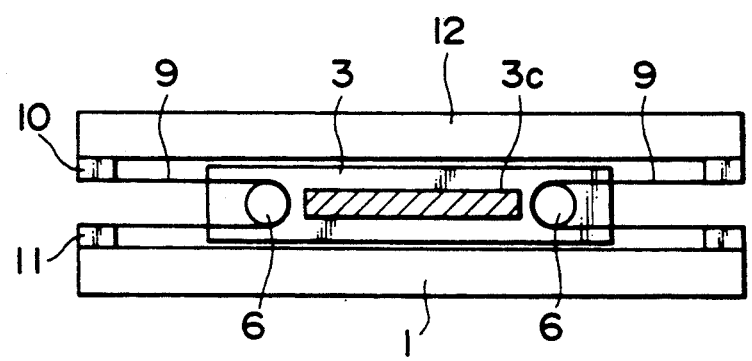
FIG. 1b is a schematic illustration showing in side elevation the linear motion guide unit of FIG. 1a when its table 12 is located at its home position relative to its bed 1.

As best shown in FIG. 1b, also provided in the present embodiment is a belt 9 which has its one end fixedly attached to a lower fixture member 11 of the bed 1 and its other end fixedly attached to an upper fixture member 10 of the table 12. An intermediate portion of the belt 9 extends into the space defined between the bed 1 and the table 12 and passed around a corresponding pin 6. The pin 6 may be provided fixedly or rotatably. The pin 6 may be provided with an irregular surface which mates with an irregular surface which may also be provided in the belt 9. The belt 9 and the pin 6 may be fabricated from steel similarly as the bed 1 and the table 12. Alternatively, the belt 9 and the pin 6 or at least one of them may be fabricated from any other materials, such as a synthetic resin material, if desired. Besides, the belt 9 does not have to be a belt and it may be any flexible member, such as a code, cable or cloth, which can be operatively coupled to an associated pin 6 with its both ends fixedly attached to the fixture members 10 and 11 of the table 12 and the bed 1, respectively.

In operation, FIG. 1b illustrates a reference condition with the table 12 located at its home position relative to the bed 12. It is to be noted that the illustrated embodiment assumes that the bed 1 is fixedly mounted on a stationary object and the table 12 moves back and forth relative to the stationary bed 1. However, the present invention should not be limited to such a specific example and the table 12 may be fixedly attached to a stationary object with the bed provided to be movable back and forth relative to the stationary table 12.

Figure 2A:
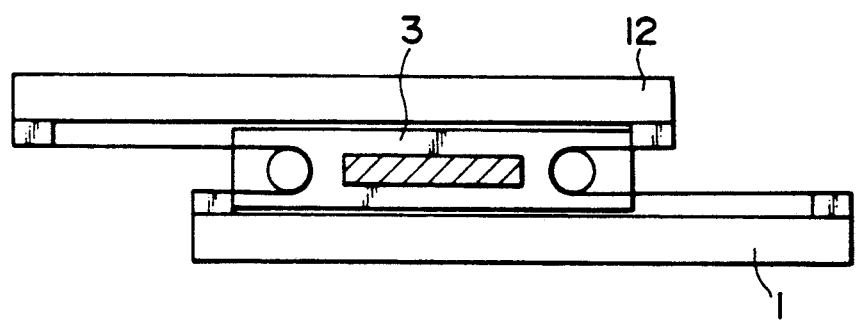
FIG. 2a is a schematic illustration showing in side elevation the linear motion guide unit of FIG. 1a when its table 12 is located at its leftmost position relative to its bed 1.
Figure 2B:
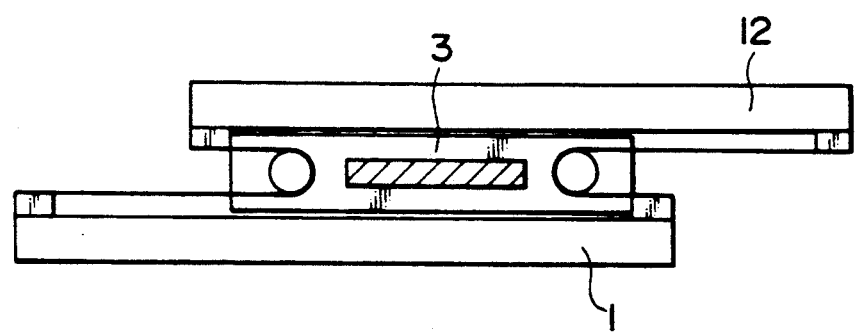
FIG. 2b is a schematic illustration showing in side elevation the linear motion guide unit of FIG. 1a when its table 12 is located at its rightmost position relative to its bed 1.

Under the condition, when the table 12 is caused to move to the left as shown in FIG. 2a, the belt 9 moves around the pin 6 in unison, so that the retainer 3 is limited to a half of the movement of the table 12 at all times. FIG. 2b illustrates the case in which the table 12 is caused to move to the right relative to the bed 1. In this case also, the retainer 3 is limited to a half of the movement of the table 12 relative to the bed 1.

In the above-described structure, use has been made of a pin 6; however, any other alternative element, such as a wheel having a pin, may be used in place of a pin 6. In addition, use may also be made of rollers in place of balls 4, if desired. In such a case, however, the rollers should be provided in the so-called crossed arrangement wherein any two adjacent rollers have their rotating axes extending perpendicular to each other when viewed in the direction of travel.

As described above, in accordance with the present invention, the movement of the retainer 3 can be controlled properly and limited to a half of the movement of either of the table or the bed at all times. Thus, the retainer 3 is securely prevented from being shifted in position undesirably. In addition, since the pins 6 are disposed inside the space defined by the bed 1 and the table 12, the size of the overall structure can be minimized and the moving parts can be placed in an enclosed space as much as possible, thereby allowing to prevent the occurrence of any interference with any other objects.

While the above provides a full and complete disclosure of the preferred embodiments of the present invention, various modifications, alternate constructions and equivalents may be employed without departing from the true spirit and scope of the invention. For example, two or more the guide grooves 1c and 12b may be provided in parallel. In this case, the retainer 3 may also be provided with two or more lines of holes 5 different in level commensurate with two or more lines of guide grooves 1c and 12b different in level. Therefore, the above description and illustration should not be construed as limiting the scope of the invention, which is defined by the appended claims.

What is claimed is:

1. A linear motion guide unit, comprising:
   a bed elongated in shape and provided with first guiding means extending in parallel with a longitudinal axis of said unit;
   a table elongated in shape and provided with second guiding means which is located opposite to and in parallel with said first guiding means to thereby define a guide channel;
   a plurality of rolling members provided in said guide channel partly received in said first and second guiding means to thereby provide a rolling contact between said bed and said table;
   a retainer elongated in shape, but shorter in length than each of said bed and said table for retaining said plurality of rolling members in position;
   a pair of engaging means provided at respective ends of said retainer; and
   a pair of flexible coupling means, each of which has one end fixedly attached to said bed and other end fixedly attached to said table with its intermediate portion extending into a space defined between said bed and said table and passed around a corresponding one of said pair of engaging means.

2. The unit of claim 1, wherein said bed has a generally U-shaped cross section and said table also has a generally U-shaped cross section.

3. The unit of claim 2, wherein one of said bed and said table is turned upside down such that an open side of said bed is in an opposed relation with an open side of said table.

4. The unit of claim 3, wherein said table is larger in width than said bed such that said bed is substantially enclosed within an interior space defined by said table.

5. The unit of claim 4, wherein said retainer has a generally M-shaped cross section with its pair of outer side walls located between a corresponding pair of side walls of said bed and said table.

6. The unit of claim 5, wherein said side wall of said bed of said corresponding pair has an inner groove formed at its surface and said side wall of said table of said corresponding pair has an outer groove formed at its surface in an opposed relation with said inner groove to thereby define a guide channel.

7. The unit of claim 1, wherein each of said first and second engaging means includes a pin mounted on said retainer extending horizontally.

8. The unit of claim 7, wherein said flexible coupling means includes a belt.

* * * * *